(12) United States Patent
Komiya

(10) Patent No.: US 7,591,128 B2
(45) Date of Patent: Sep. 22, 2009

(54) CABLE PROTECTION AND GUIDE DEVICE

(75) Inventor: Shoichiro Komiya, Osaka (JP)

(73) Assignee: Tsubakimoto Chain CO., Osaka (JP)

( * ) Notice: Subject to any disclaimer, the term of this patent is extended or adjusted under 35 U.S.C. 154(b) by 0 days.

(21) Appl. No.: 12/098,432

(22) Filed: Apr. 6, 2008

(65) Prior Publication Data

US 2008/0271429 A1 Nov. 6, 2008

(30) Foreign Application Priority Data

May 2, 2007 (JP) .............................. 2007-121888

(51) Int. Cl.
*F16G 13/16* (2006.01)

(52) U.S. Cl. ............................. 59/78.1; 59/900; 248/49; 248/51

(58) Field of Classification Search .................. 59/78.1, 59/900; 248/49, 51

See application file for complete search history.

(56) References Cited

U.S. PATENT DOCUMENTS

| | | | |
|---|---|---|---|
| 4,813,224 A | 3/1989 | Blase | |
| 4,833,876 A * | 5/1989 | Kitao et al. | 59/78.1 |
| 5,220,779 A * | 6/1993 | Tatsuta et al. | 59/78.1 |
| 6,167,689 B1 * | 1/2001 | Heidrich et al. | 59/78.1 |
| 6,550,233 B2 * | 4/2003 | Blase | 59/78.1 |
| 6,992,254 B2 * | 1/2006 | Komiya | 248/49 |

* cited by examiner

*Primary Examiner*—David B Jones
(74) *Attorney, Agent, or Firm*—Woodling, Krost and Rust (57) ABSTRACT

A cable protection and guide device, wherein: the warp in front and rear side portions of link plates in the width direction is reliably limited so that an inadvertent disengagement between the link plates is completely blocked. The connection between the link plates is easy and manufacturing of the link plates is easy. Short arc-shaped warp limiting lock grooves are formed along a path coaxially spaced from a connecting pin or a connecting pin hole. Short arc-shaped warp limiting lock pieces are fitted to the short arc-shaped warp limiting lock grooves in a concave element/convex element engagement opposed surfaces of the link plates connected in the longitudinal direction so that warping in the front and rear side portions of the link plates in a width direction is limited.

12 Claims, 12 Drawing Sheets

CABLE PROTECTION AND GUIDE DEVICE

This application claims priority to Japanese Patent Application No. 2007-121888 filed May 2, 2007.

TECHNICAL FIELD

The present invention relates to a cable or the like protection and guide device. The device securely and reliably protects and guides a flexible cable or the like. The cable may be an electrical cable, a hydraulic hose, a pneumatic hose, or an optical fiber cable. These cables may be used in industrial machines such as a machine tool, an electric device, an industrial robot, a transportation machine or the like. The cables may transmit electrical power or electric control signals to the movable parts of the machines.

BACKGROUND TECHNOLOGY

There are devices such as an energy supply chain for accommodating a cable, a tube or the like. A chain member is formed in a box shape. A plug and a circular opening portion are alternately provided on a side wall portion. A plug of the chain member is fitted into an opening portion of the chain member. Relative pivot movement of a sequential chain member is limited by a stopper 511 in a side wall portion of a sequential chain member. See, for example, Japanese Examined Patent Publication NO. Hei 5-82501, page 1, FIGS. 4 and 5.

Patent Reference 1 is Japanese Examined Patent Publication No. Hei. 5-82501 (page 1, FIGS. 4 and 5).

PROBLEMS TO BE SOLVED BY THE INVENTION

Figure 12:
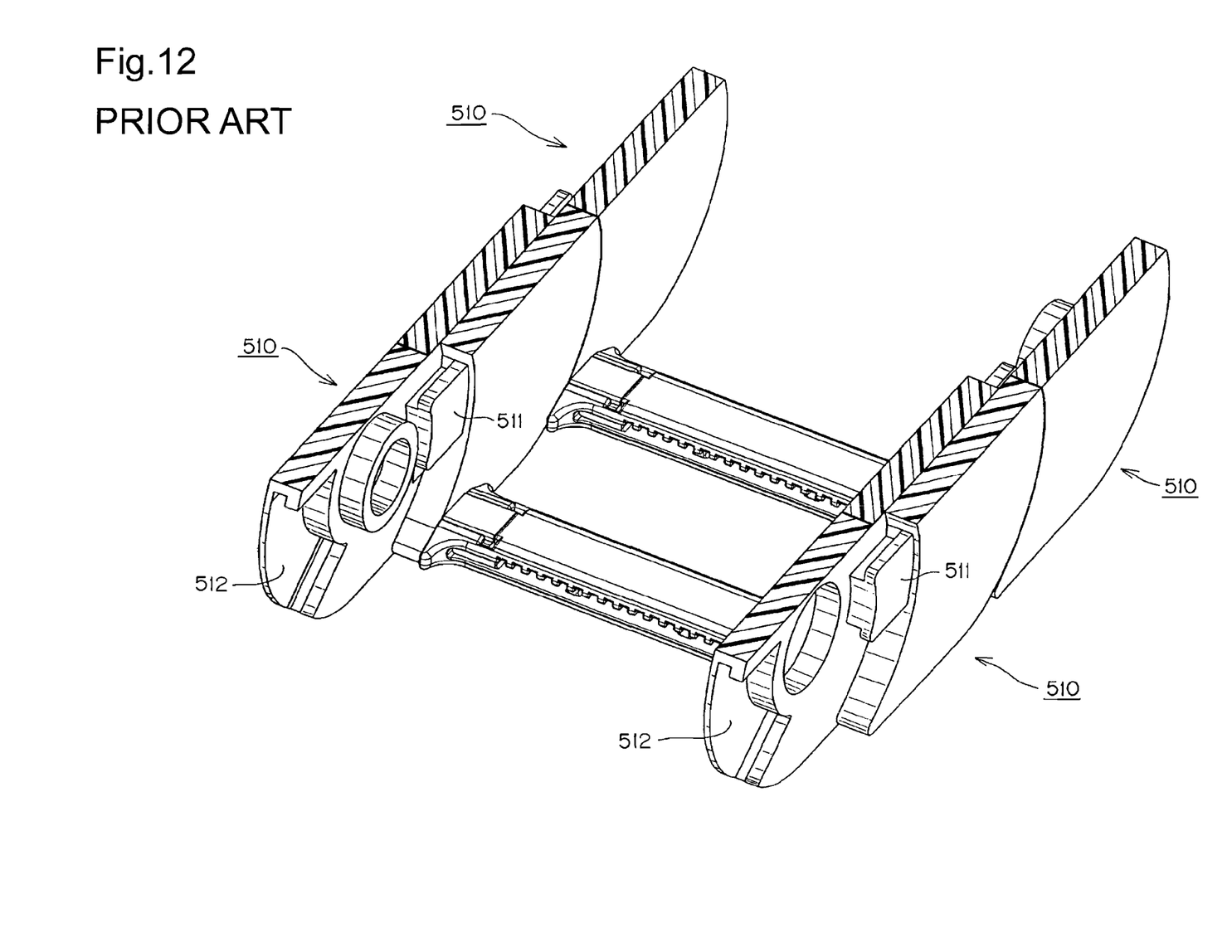
FIG. 12 is a partially cut out perspective view showing a connection state between conventional chain members.

The above-described energy supply chain, Patent Reference 1, shown in FIG. 12, includes a stopper 511 provided on a side plate 510 for limiting a pivot movement of a chain member. The stopper 511 assumes three-dimensional concave/convex shaped protrusions. The three-dimensional concave/convex shaped protrusions extend in both the thickness direction of the side plate 510 and in the bending inner and outer circumferential side directions. A fan-shaped concave portion 512, which accommodates this stopper 511, assumes three-dimensional concave/convex shaped hook portions both in the thickness direction of the side plate and in the bending inner and outer circumferential side directions. The energy supply chain has a structure which stops disengagement with an adjacent chain member.

There are troublesome problems with the structure of Patent Reference 1. Namely, stopper 511 which assumes such three-dimensional concave/convex shaped protrusions and the fan-shaped concave portion 512 which assumes three-dimensional concave/convex shaped hook portions complicate extraction of the molded side plate 510. Further, connection of the chain members is difficult.

MEANS FOR SOLVING THE PROBLEMS

The above-mentioned problems are addressed by a cable protection and guide device having generally rectangularly-shaped link frame bodies. Each link body comprises a pair of right and left spaced link plates. The link plates include front and rear portions. Connecting plates are bridged over the bending inner circumferential side and bending outer circumferential side of the pair of link plates. The link plates include connecting pins and connecting pin holes. The link plates are connected to each other in the longitudinal direction by the connecting pins and connecting pin holes. The link plates are offset at the front side portion and the rear side portion. The cable is protected and guided in the cable accommodating space formed of a plurality of the flexibly connected link plates and connecting arms. Short arc-shaped warp limiting lock grooves reside along an arc path coaxially spaced from the connecting pin or the connecting pin hole. Short arc-shaped warp limiting lock pieces reside along an arc path coaxially spaced from the connecting pin or the connecting pin hole. The short arc-shaped warp limiting lock pieces of a first plate are fitted to the short arc-shaped warp limiting lock grooves of an adjacent second plate in a concave element/convex element engagement. The short arc-shaped warp limiting lock pieces and short arc-shaped warp-up limiting lock grooves reside on opposed surfaces of adjacent link plates connected in the longitudinal direction so that warping of the front and the rear side portions of the link plates in a width direction is limited.

A bending operation area limiting concave portion is formed between the arc path coaxially spaced from the connecting pin or the connecting pin hole. A bending operation area limiting convex portion is formed between the arc path coaxially spaced from the connecting pin or pin hole. The bending operation area limiting convex portion is fitted to the bending operation area limiting concave portion in a concave element/convex element arrangement. Opposed surfaces of adjacent link plates are connected in the longitudinal direction so that the bending operation area in the front and rear side portions of the link plates is limited.

The warp limiting lock grooves are disposed at positions where they span the bending action limiting concave portion along an arc path. The warp limiting lock pieces are disposed at positions where they span the bending operation area limiting convex portion along an arc path.

The front and rear side portions of the link plates have shapes that enable interchangeability between front and rear portions. The right and left link plates are interchangeable.

Accordingly, an object of the present invention is to solve the above-mentioned problems and provide a cable protection and guide device in which warping in front and rear side portions of the link plates in the width direction is limited. Inadvertent disengagement between the link plates is completely blocked. The molding of the link plate is easy and the assembly of the link plates is also easy.

EFFECTS OF THE INVENTION

Rectangularly-shaped in cross-section link frame bodies each comprise a pair of right and left spaced link plates. Connecting plates are bridged over the bending inner circumferential side and bending outer circumferential side of the pair of link plates. The link plates are connected to each other in a longitudinal direction by connecting pins and connecting pin holes. The link plates are offset at the front side portion and the rear side portion. A cable can be protected and guided in a cable accommodating space formed of a plurality of flexibly connected link plates. Additionally, the following effects are obtained.

A short arc-shaped warp limiting lock groove is formed along an arc path coaxially spaced from the connecting pin or the connecting pin hole and a short arc-shaped warp limiting lock piece. The short arc-shaped warp limiting lock piece of one link plate is fitted to the short arc-shaped warp limiting lock groove of an adjacent link plate in a concave element/convex element relationship. The short arc-shaped warp limiting lock piece and the short arc-shaped warp lock piece are on opposed surfaces of adjacent link plates connected in the longitudinal direction. When an external force warps front and rear side portions of the link plates in the width direction during bending of the link plates, the short arc-shaped warp limiting lock groove and the short arc-shaped warp limiting lock piece interengage and prevent disconnection. The outer circumferential edge of a link plate subjected to stress is deformed and torsion is generated between the adjacent opposed circumferential edges of the link plates and disengagement is prevented. Resistance is generated in the width direction and disengagement is prevented. Thus, warping of front and rear side portions of the link plates in the width direction is limited so that inadvertent disengagement between the link plates can be prevented. Additionally, the short arc-shaped warp limiting lock groove and the short arc-shaped warp limiting lock piece are fitted to each other in a concave element/convex element engagement along an arc path without deformation from the width direction during connection of the link plates. Therefore, the connection of the link plates is easy.

Engagement between the short arc-shaped warp limiting lock groove and the short arc-shaped warp limiting lock piece is a simple solution to the above-identified problem. Molding of the link plates is easy.

A bending area limiting concave portion formed along an arc path coaxially spaced from the connecting pin or the connecting pin hole and a bending area limiting convex portion are fitted together in a concave element/convex element relationship. The bending area limiting concave portion and the bending area limiting convex portion reside on adjacent opposed surfaces of the link plates. The bending operation area in the front and rear side portions of the link plates is limited. It is easy to change from the bending position to the linear position.

Warp limiting lock grooves are adjacently disposed at positions where they span the bending action limiting concave portion along an arc path and the warp limiting lock pieces are adjacently disposed at positions where they span the bending operation area limiting convex portion along an arc path. A pair of short arc-shaped warp limiting lock pieces disposed in a cutting manner while spanning the bending operation area limiting convex portion, when considering several of the link frame bodies, substantially functions as a series of arc-shaped warp limiting lock pieces along an arc path. Thus, even if an inadvertent external force that warps the front and rear side portions of the link plates in a width direction is applied during the bending movement of the link plates, large torsional resistance is generated at opposed circumferential edges of the link plates. Warping of the front and rear side portions of the link plates in the width direction is reliably limited so that inadvertent disengagement of the link plates is prevented.

The front and the rear side portions of the link plates are shaped so that they can interchanged between a front portion and a rear portion and between a right side and a left side. The number of link plates required is reduced. Molding of the link plate is simplified.

DESCRIPTION OF THE INVENTION

The cable protection and guide device, which is an example of the present invention, will be described below with reference to FIGS. 1 to 8.

EXAMPLE

Figure 1:
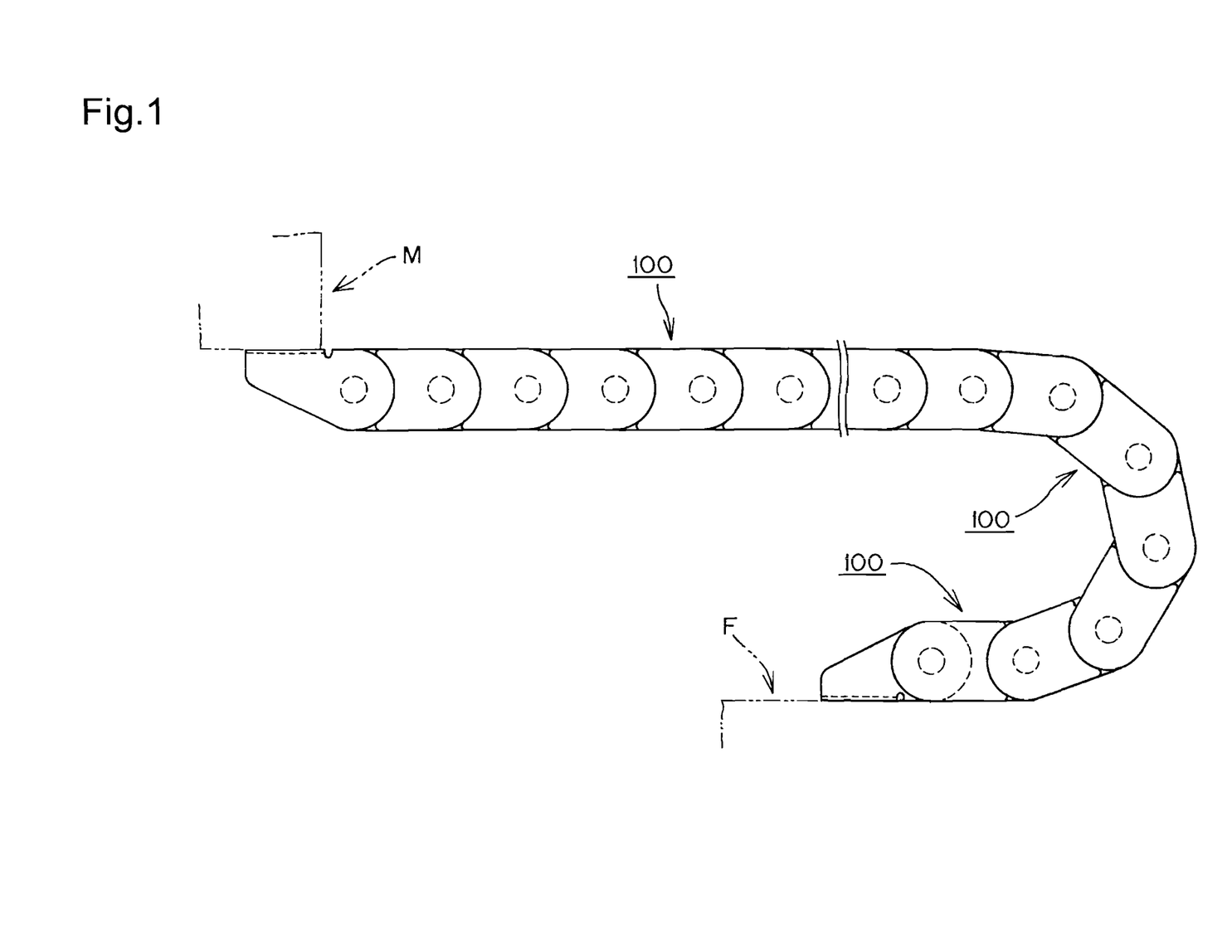
FIG. 1 is a view of a cable or the like protection and guide device, which is an example according to the present invention.
Figure 2:
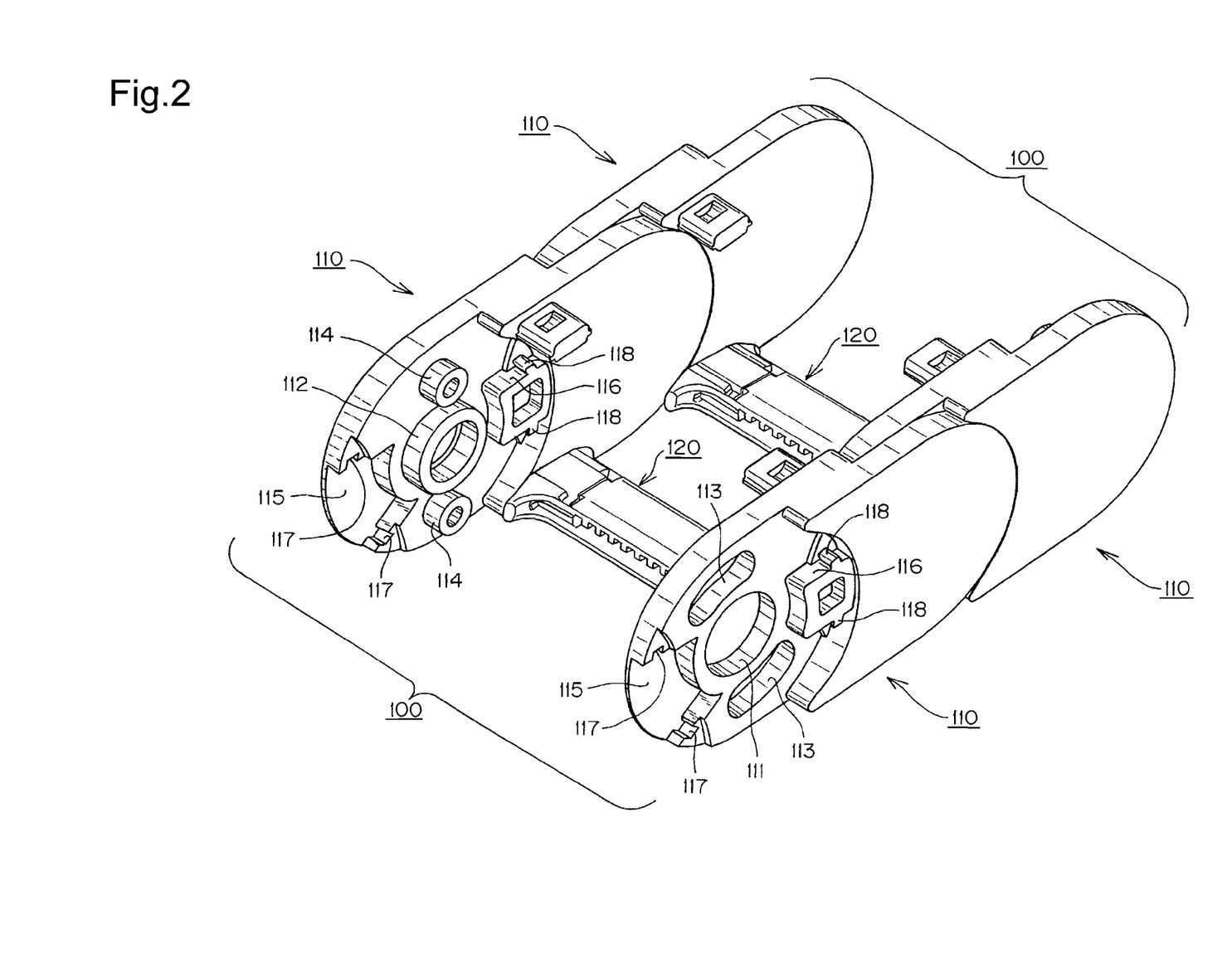
FIG. 2 is a perspective view showing a connection state of link plates in FIG. 1.
Figure 3:
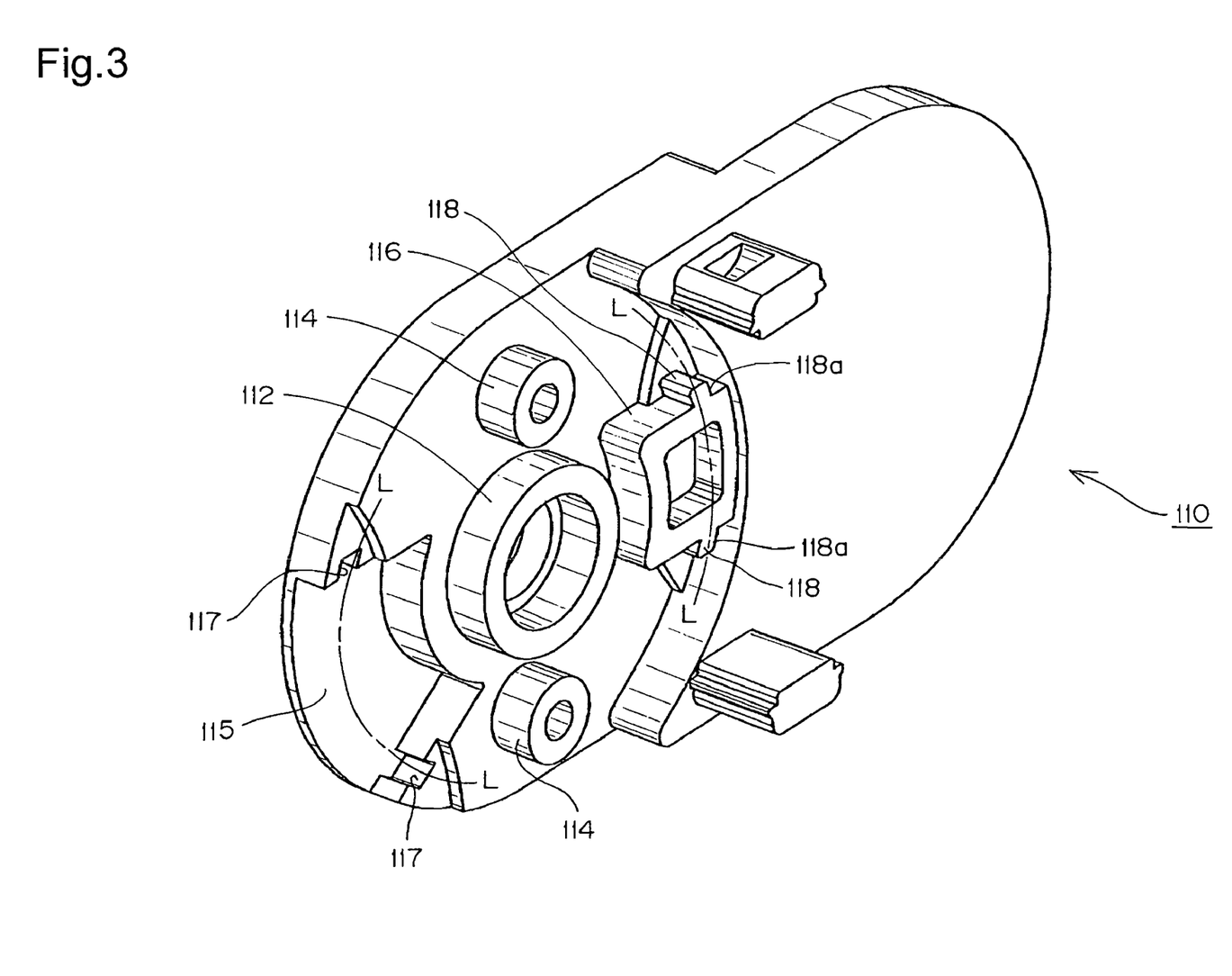
FIG. 3 is a perspective view of a link plate used in the example viewed from a cable accommodating space side.
Figure 4:
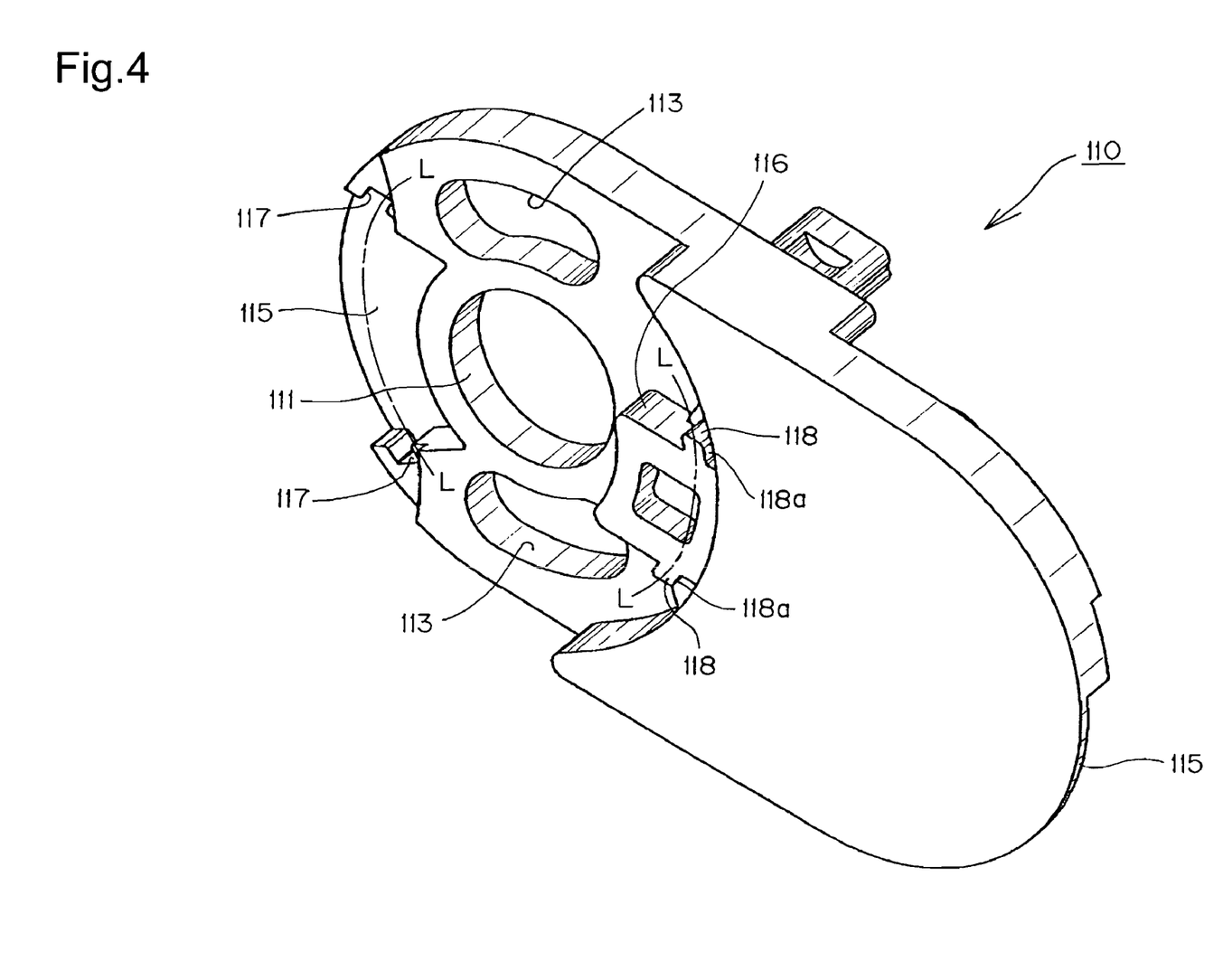
FIG. 4 is a perspective view of the link plate shown in FIG. 3 viewed from the outside of the cable accommodating space.
Figure 5:
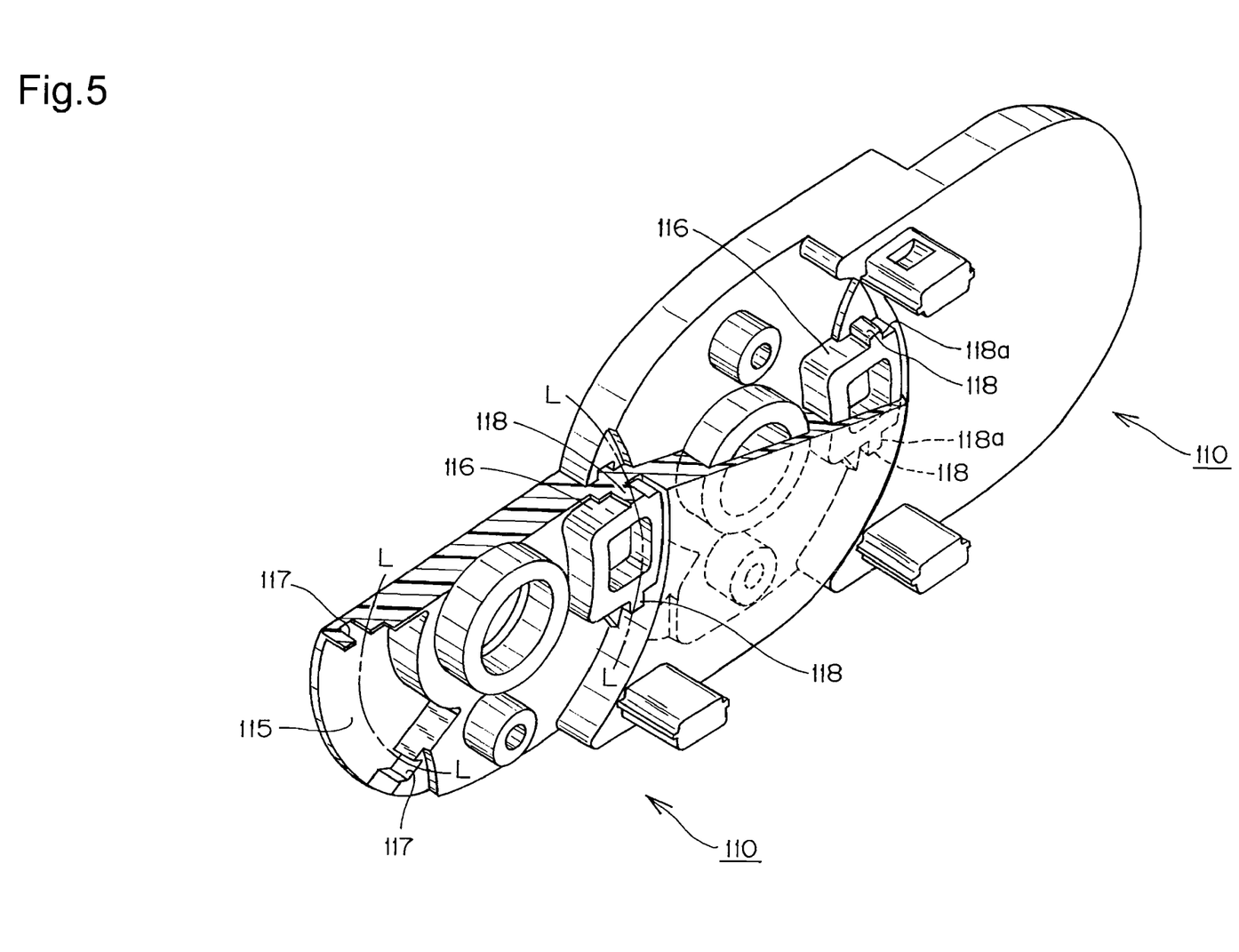
FIG. 5 is a partially cut out perspective view of a connection state between link plates viewed from the cable accommodating space side.
Figure 6:
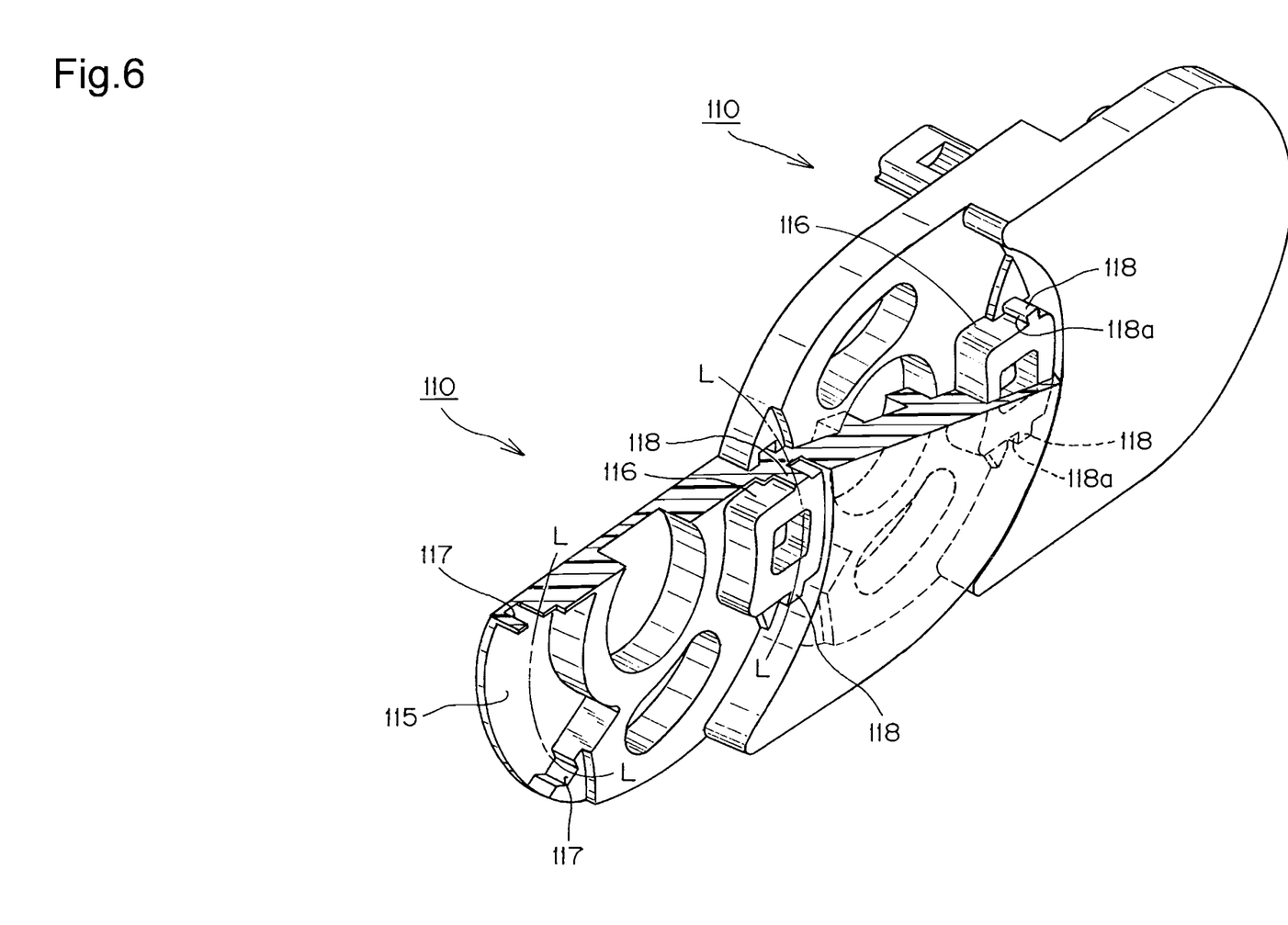
FIG. 6 is a partially cut out perspective view of a connection state between the link plates from outside of the cable accommodating space.
Figure 7:
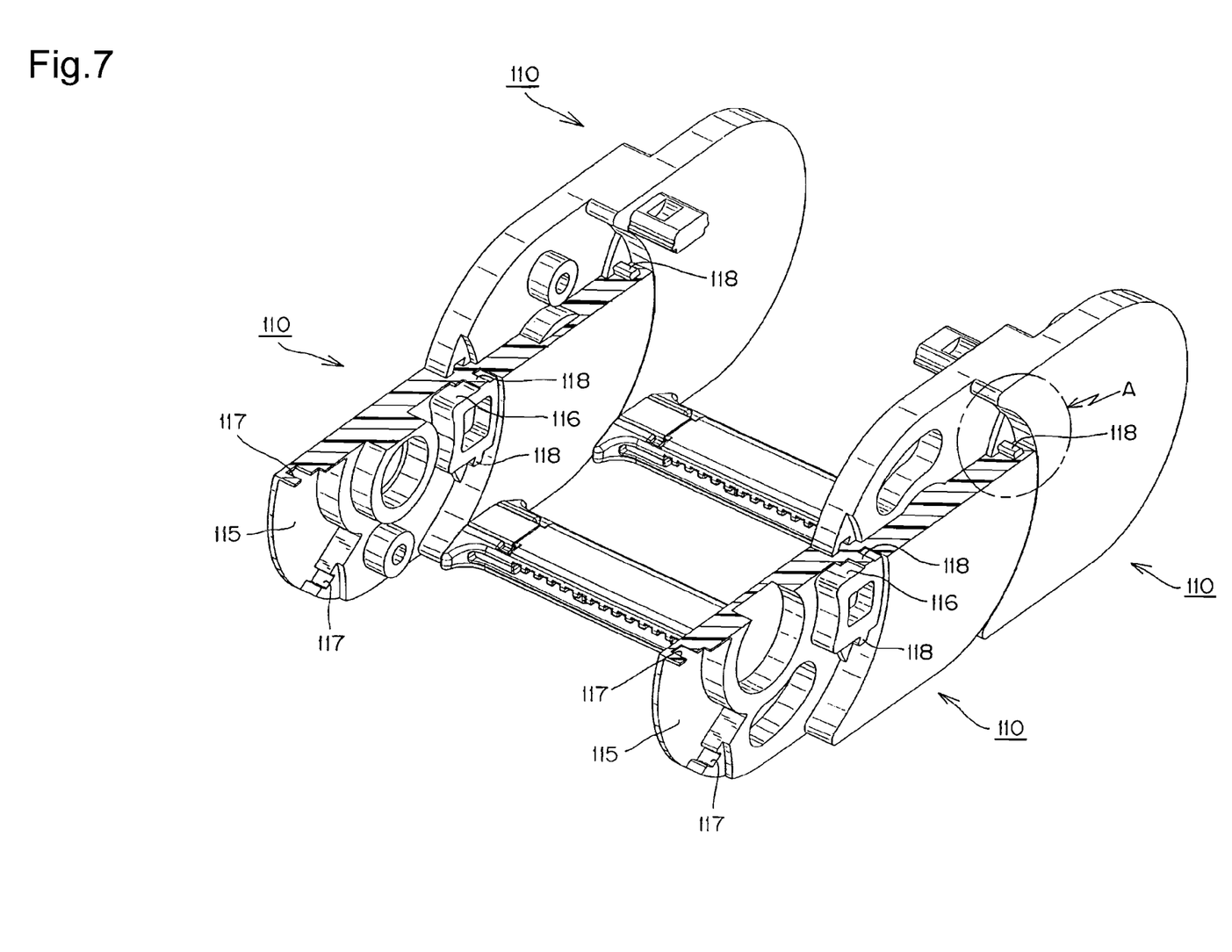
FIG. 7 is a partially cut out perspective view showing a principal portion, which limits warp.
Figure 8:
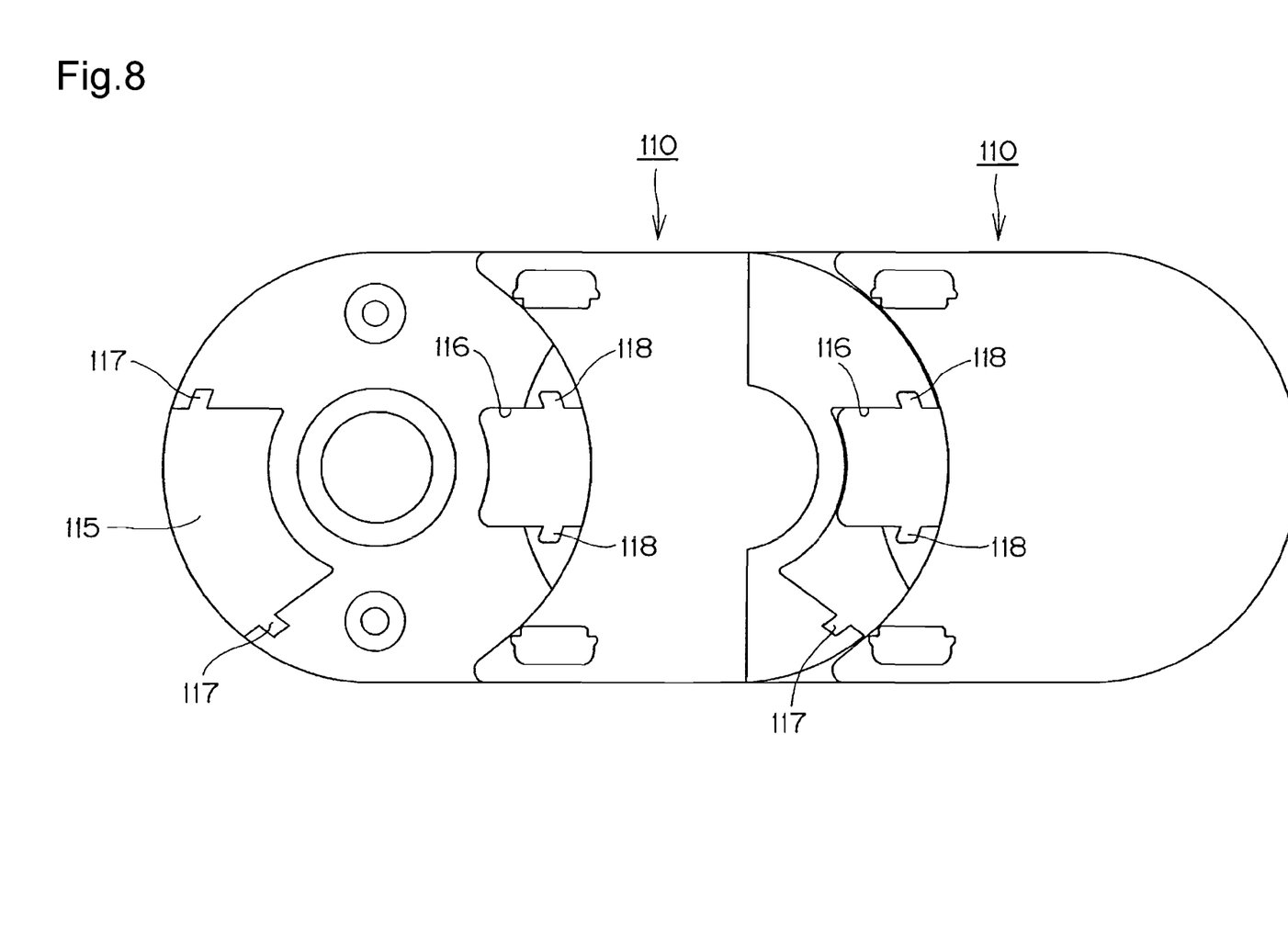
FIG. 8 is a side view showing a simplified linear position state between link plates.
Figure 9:
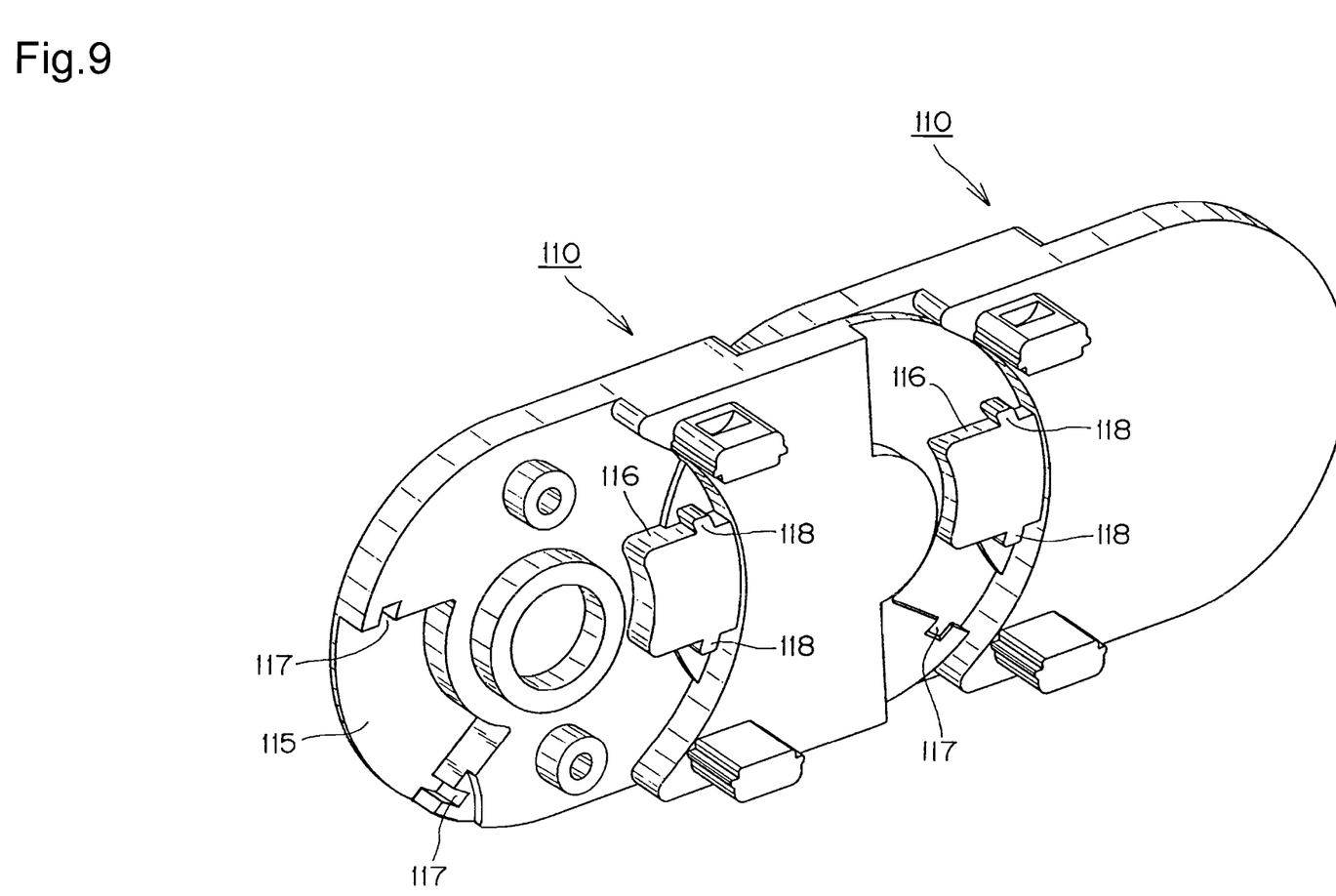
FIG. 9 is a perspective view of a linear position state shown in FIG. 8.
Figure 10:
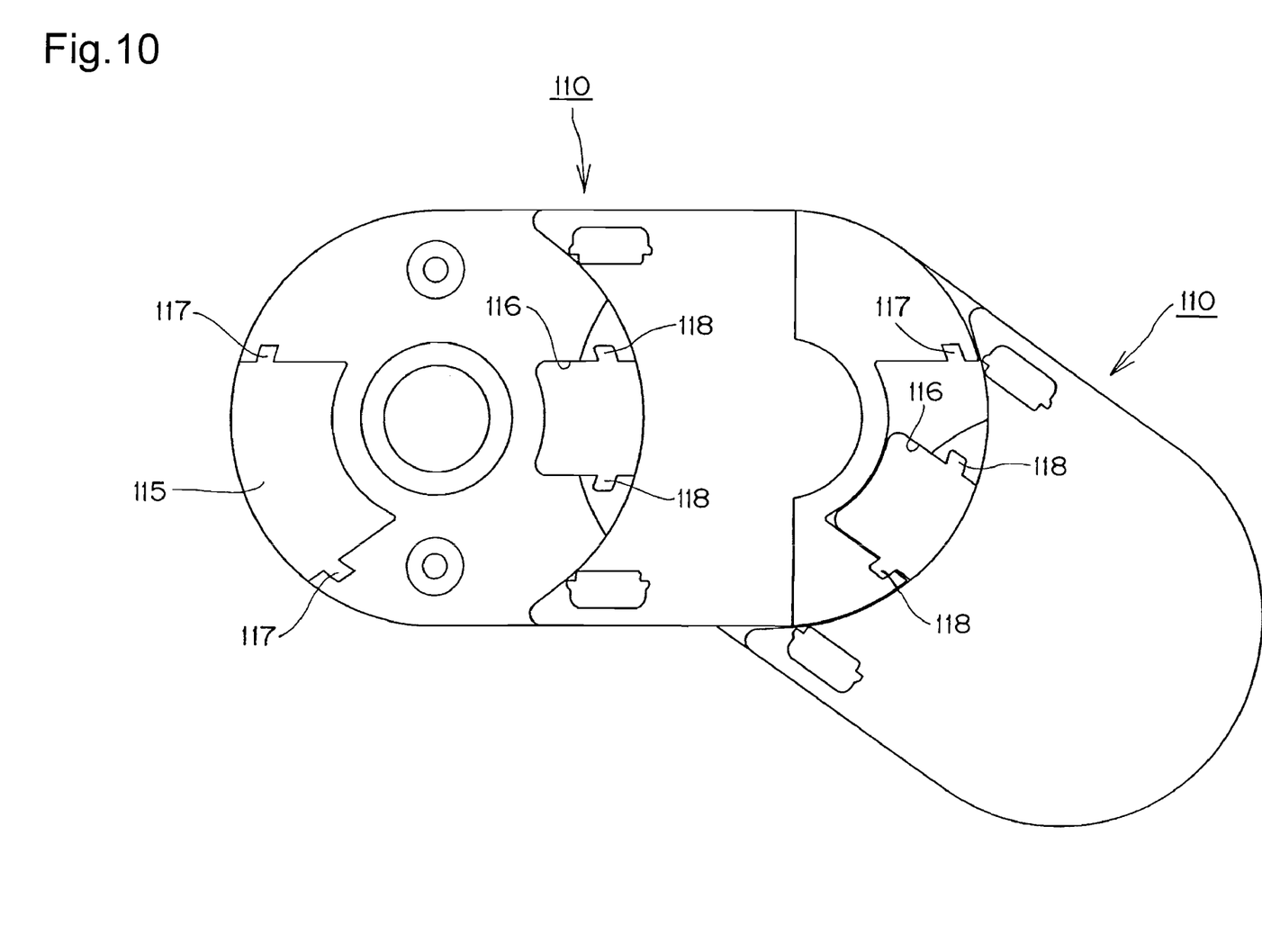
FIG. 10 is a side view showing a simplified bending position state between link plates.
Figure 11:
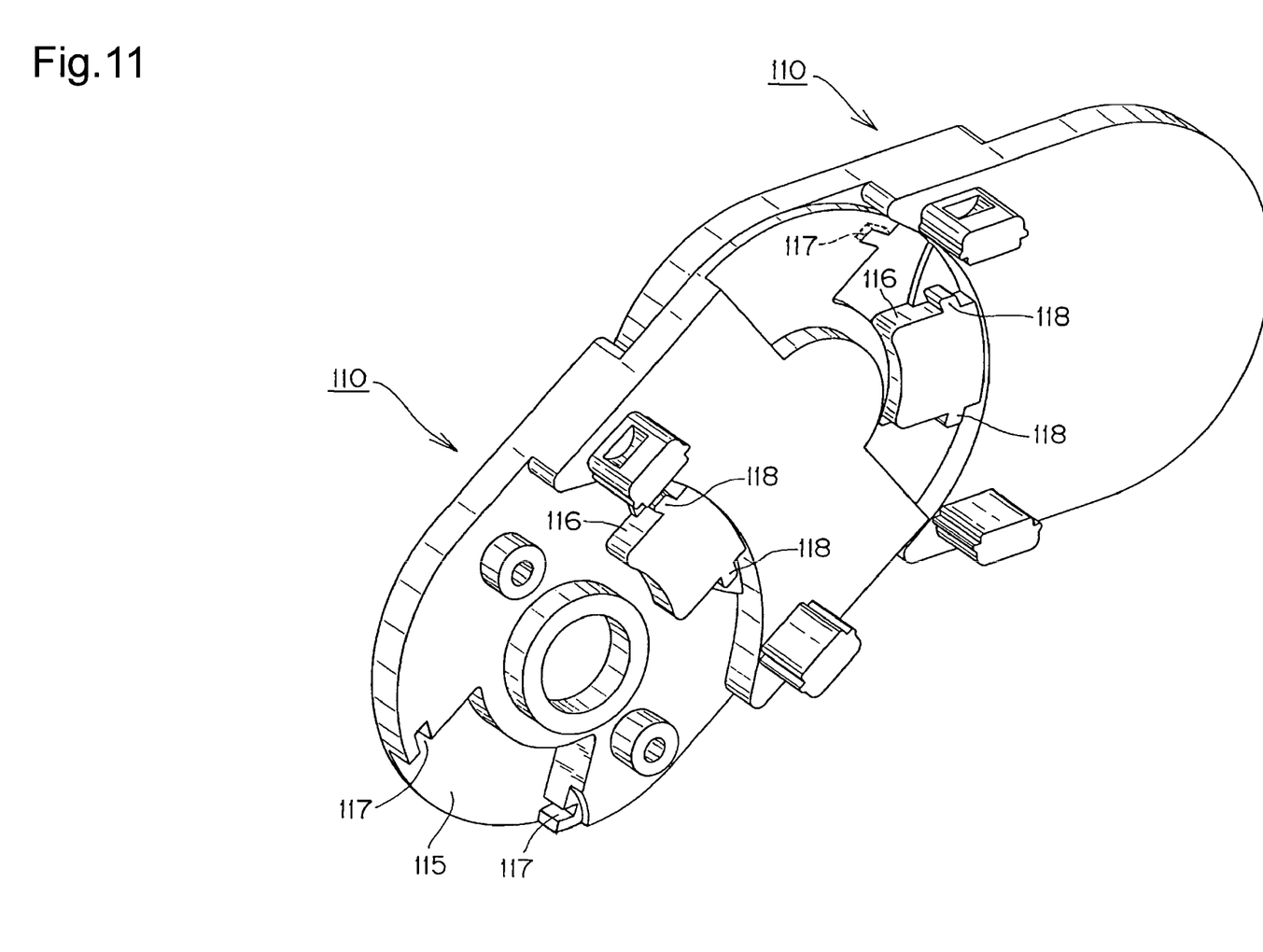
FIG. 11 is a perspective view of a bending position state shown in FIG. 10.

FIG. 1 is a view of a cable protection and guide device, which is an example according to the present invention. FIG. 2 is a perspective view showing a connection state of the link plates in FIG. 1. FIG. 3 is a perspective view of a link plate used in the example viewed from a cable accommodating space side. FIG. 4 is a perspective view of the link plate shown in FIG. 3 viewed from the outside of the cable accommodating space. FIG. 5 is a partially cut out perspective view of a connection state between link plates viewed from a cable accommodating space side. FIG. 6 is a partially cut out perspective view of a connection state between the link plates from the outside of the cable accommodating space. FIG. 7 is a partially cut out perspective view showing a principal portion, which limits warp. FIG. 8 is a side view showing a simplified linear position state between link plates. FIG. 9 is a perspective view of a linear position state shown in FIG. 8. FIG. 10 is a side view showing a simplified bending position state between link plates. FIG. 11 is a perspective view of a bending position state shown in FIG. 10.

A cable protection and guide device according to an example of the present invention is used for protecting and guiding a cable(s) or the like C such as an electric cable. Cable C may transmit an electric signal or a supply of power. Cable C can be a hose which supplies hydraulic pressure and pneumatic pressure. The electric cable and the hose connect between a movable portion M and a stationary portion F of a device such as a plasma display, a semiconductor production device, or a vehicle as shown in FIG. 1. The cable protection and guide device includes a plurality of generally rectangularly-shaped in cross-section link frame bodies 100 connected to each other in the longitudinal direction. A linear position state or a bending position state can be assumed in accordance with movement conditions between a movable portion M and a stationary portion F. A cable(s) can be protected and guided when inserted into a cable accommodating space R formed by the interconnected link frame bodies 100.

The articulate connection of the plates to each other in a longitudinal direction enable a portion of the side plates to form a flexional circumferential bend having a flexional inner circumferential side and flexional outer circumferential side during bending of the portion. Each of the side plates includes a flexional inner circumferential side residing during bending on the flexional inner circumferential side of the bend. Each of the side plates includes an outer circumferential side residing during bending on the outer flexional circumferential side of the bend.

The above-described link frame body 100 is molded, as shown in FIG. 2, of a glass fiber reinforced polyamide resin, which has excellent strength properties. The link frame body 100 is manufactured by incorporating a pair of right and left spaced link plates 110, 110, bending inner circumferential side connecting plates 120 attachably bridged on a bending inner circumferential side of these link plates 110, 110 and a bending outer circumferential side connecting plates (not shown) attachably bridged on a bending outer circumferential side of these link plates 110, 110 in a generally rectangular cross-sectional shape.

Further, link plates 110, as shown in FIGS. 3 and 4, include a front side portion and a rear side portion. The link plates have a stepped, off-set structure in the plate width direction. The front side portion of this link plate 110 is provided with a connection pin hole 111, and the rear side portion of this link plate 110 is provided with a connecting pin 112 having substantially the same outer diameter as the inner diameter of the connecting pin hole 111 into which the connecting pin 112 is fitted.

It is noted that the reference numeral 113 shown in FIGS. 3 and 4 denotes a bending guide hole by which the link plates 110, 110 are pivoted with respect to each other. The reference numeral 114 denotes a bending guide pin which is fitted to the bending guide hole 113 to be guided.

As shown in FIGS. 5 and 6, the link frame bodies 110 are connected to each other by fitting the connecting pins 112 to the connecting pin holes 111 of the continuously disposed link plates 110, 110, and can be bent by being pivoted about the connecting pin 112. Thus during the bending state adjacent link plates articulate with respect to each other.

Further, as apparent from FIGS. 2 to 6, the front and rear side portions of the link plate 110 can be interchanged. The molding of the link plate is easy.

Further, as shown in FIGS. 3 and 4, the front side portion and the rear side portion of the link plate 110 are respectively provided with a bending area limiting concave portion 115 and a bending area limiting convex portion 116 formed along arc paths coaxially spaced from the connecting pin 112 or the connecting pin hole 111.

The bending area limiting concave portion 115 and bending area limiting convex portion 116 provided on the rear side portion of the preceding link plate 110 are respectively fitted to a bending area limiting convex portion 116 and a bending area limiting concave portion 115 provided on the front side portion of the subsequent link plate 110 in a concave element/convex element engagement. Thus the bending areas in the front side portions and rear side portions of the link plates 110, 110 are limited so that the transition from the bending position to the linear position is smoothly performed.

Next, a warp limiting mechanism for limiting the warp in front and rear side portions of link plates 110, 110 in the width direction, which is the most characteristic type of warping, will be described in detail with reference to FIGS. 3 to 6.

Opposed surfaces of adjacent link plates 110, 110 are connected in the longitudinal direction as described above. Short arc-shaped warp limiting lock grooves 117 and short arc-shaped warp limiting lock pieces 118 engage in a concave element/convex element arrangement when the adjacent link plates are connected. The lock grooves 117 and lock pieces 118 are arranged in an arc path L spaced apart from the connecting pin 112 or the connecting pin hole 111.

It is noted that the reference numerals 118a shown in FIGS. 3 to 6 denote warp limiting arc surfaces for limiting warp formed in the short arc-shaped warp-up limiting lock piece 118.

Short arc-shaped warp limiting lock grooves 117 are located in the walls that form the bending area limiting concave portion 115 along the arc path L. Short arc-shaped warp limiting lock pieces 118 are disposed on the bending area limiting convex portion 116 along the arc path L. Short arc-shaped warp limiting locks are oriented on the bending area limiting convex portion of each link plate. When the link plates are articulately connected in the longitudinal direction, a series of articulately connected links substantially function as a series of arc-shaped warp limiting lock pieces along respective arc paths L, thus limiting the radius of curvature of the inner circumferential sides during bending.

In adjacent links of the cable protection and guide device, the short arc-shaped warp limiting lock grooves 117 are fitted to the short arc-shaped warp-up limiting lock pieces 118 in a concave element/convex element engagement along an arc path coaxially spaced from the connecting pin 112 or the connecting pin hole 111. Thus, even if inadvertent external warping force is applied to the front and rear side portions of the link plates in the width direction, (for example, during a transfer operation from a linear position state of link plates 110, 110 shown in FIGS. 8 and 9 or during a transfer operation from a bending position state of link plates 110, 110 shown in FIGS. 10 and 11), large torsional resistance is generated in the width direction at warp limiting arc surfaces 118a.

That is the opposed circumferential edges of the link plates 110 come into contact with opposed link plates in a twisted state so that the warping of front and rear side portions of the link plates in the width direction is reliably limited whereby inadvertent disengagement between the link plates 110, 110 can be completely prevented.

The engagement between the short arc-shaped warp-up limiting lock groove 117 and the short arc-shaped warp-up limiting lock piece 118 is simple and the molding of the link plate 110 is simplified.

Additionally, the short arc-shaped warp-up limiting lock groove 117 and the short arc-shaped warp-up limiting lock piece 118 are fitted to each other in a concave element/convex element engagement along an arc path without deformation in the width direction during connection of adjacent link plates 110, 110. The connection of the link plates 110, 110 is easily attained. The effects of the example are very large.

DESCRIPTION OF REFERENCE NUMERALS

100 . . . Link frame body
110 . . . Link plate
111 . . . Connecting pin hole
112 . . . Connecting pin
113 . . . Bending guide hole
114 . . . Bending guide pin
115 . . . Bending operation area limiting concave portion
116 . . . Bending operation area limiting convex portion
117 . . . Warp limiting lock groove
118 . . . Warp limiting lock piece
118a . . . Warp limiting arc surface
120 . . . Bending inner circumferential side connecting plate
510 . . . Side plate 511 ... Stopper
512 ... Fan-shaped concave portion
C ... Cable or the like
R ... Cable accommodating space
L ... arc path The invention has been set forth by way of example. Those skilled in the art will readily recognize that changes may be made to the invention without departing from the spirit and scope of the invention as set forth in the Claims below.

The invention claimed is:

1. A cable protection and guide device comprising:
   a plurality of pairs of right and left spaced side plates;
   each of said side plates include a connecting pin and connecting pin hole;
   each of said side plates are articulately connected to adjacent side plates in a longitudinal direction, said connecting pins of said plates interfit with said connecting pin holes;
   said articulate connection of said plates to each other in a longitudinal direction enable a portion of said side plates to form a flexional circumferential bend having a flexional inner circumferential side and flexional outer circumferential side during bending of said portion;
   each of said side plates includes a flexional inner circumferential side residing during bending on said flexional inner circumferential side of said bend;
   each of said side plates includes an outer circumferential side residing during bending on said outer flexional circumferential side of said bend;
   connecting plates bridged over each of said bending inner circumferential sides and each of said bending outer circumferential sides of each of said pairs of said right and left spaced side plates;
   said side plates include front and rear side portions;
   said side plates being offset at said front and rear side portions thereof;
   a cable is protected and guided in a cable accommodating space formed of said plurality of flexibly connected side plates and said connecting plates;
   each of said side plates includes short arc-shaped warp limiting lock grooves oriented in an arc path coaxially spaced from said connecting pin;
   each of said side plates includes short arc-shaped warp limiting lock pieces oriented in an arc path coaxially spaced from said connecting pin;
   said short arc-shaped warp limiting lock pieces engage said short arc-shaped warp limiting lock grooves in a concave element/convex element relationship; and
   said short arc-shaped warp limiting lock pieces and said short arc-shaped warp limiting lock grooves reside on opposed surfaces of said side plates connected in the longitudinal direction so that warping in said front side portions and said rear side portions of said side plates in a width direction is limited.

2. A cable protection and guide device according to claim 1 wherein each of said side plates includes a bending area limiting concave portion and a bending area limiting convex portion, said short arc-shaped warp limiting lock pieces residing on said bending area limiting convex portion and said short arc-shaped warp limiting lock grooves residing in said bending area limiting concave portion, said short arc-shaped warp limiting lock pieces and said short arc-shaped warp limiting lock grooves define a bending area, and, said connected adjacent plates are interconnected and relative bending movement is limited.

3. A cable protection and guide device according to claim 2 wherein said relative bending movement is limited by the length of said arc path between said lock grooves.

4. A cable protection and guide device according to claim 1 wherein said side plates are interchangeable.

5. A cable protection and guide device according to claim 2 wherein said side plates are interchangeable.

6. A cable protection and guide device according to claim 3 wherein said side plates are interchangeable.

7. A cable protection and guide device comprising:
   a plurality of pairs of right and left spaced side plates;
   each of said side plates include connecting pins and connecting pin holes;
   each of said side plates are articulately connected to adjacent side plates in a longitudinal direction, said connecting pins of said plates interfit with said connecting pin holes;
   said articulate connection of said plates to each other in a longitudinal direction enable a portion of said side plates to form a flexional circumferential bend having a flexional inner circumferential side and flexional outer circumferential side during bending of said portion;
   each of said side plates includes a flexional inner circumferential side residing during bending on said flexional inner circumferential side of said bend;
   each of said side plates includes an outer circumferential side residing during bending on said outer flexional circumferential side of said bend;
   connecting plates bridged over each of said bending inner circumferential sides and each of said bending outer circumferential sides of each of said pairs of said side plates;
   said side plates include front and rear side portions;
   said side plates being offset at said front and rear side portions thereof;
   a cable is protected and guided in a cable accommodating space formed of said plurality of flexibly connected side plates and said connecting plates;
   each of said side plates includes short arc-shaped warp limiting lock grooves oriented in an arc path coaxially spaced from said connecting pin;
   each of said side plates includes short arc-shaped warp limiting lock pieces oriented in an arc path coaxially spaced from said connecting pin;
   each of said side plates includes a bending guide pin coaxially spaced from said connecting pin;
   each of said side plates includes a bending guide hole;
   said bending guide pin and said bending guide hole of adjacent articulately connected plates interfit with each other;
   said bending guide pin and said bending guide hole of adjacent articulately connected plates interfit with each other;
   said short arc-shaped warp limiting lock pieces engage said short arc-shaped warp limiting lock grooves in a concave element/convex element relationship; and
   said short arc-shaped warp limiting lock pieces and said short arc-shaped warp limiting lock grooves reside on opposed surfaces of said link plates connected in the longitudinal direction so that warping in said front side portions and said rear side portions of said side plates in a width direction is limited.

8. A cable protection and guide device according to claim 7 wherein each of said side plates includes a bending area limiting concave portion and a bending area limiting convex portion, said short arc-shaped warp limiting lock pieces residing on said bending area limiting convex portion and said short arc-shaped warp limiting lock grooves residing in said bending area limiting concave portion, said short arc-shaped warp limiting lock pieces and said short arc-shaped warp limiting lock grooves define a bending area, and, said connected adjacent plates are interconnected and relative bending movement is limited.

9. A cable protection and guide device according to claim 8 wherein said relative bending movement is limited by the length of said arc path between said lock grooves.

10. A cable protection and guide device according to claim 7 wherein said side plates are interchangeable.

11. A cable protection and guide device according to claim 8 wherein said side plates are interchangeable.

12. A cable protection and guide device according to claim 9 wherein said side plates are interchangeable.

* * * * *

UNITED STATES PATENT AND TRADEMARK OFFICE
CERTIFICATE OF CORRECTION

| | | |
|---|---|---|
| PATENT NO. | : 7,591,128 B2 | Page 1 of 1 |
| APPLICATION NO. | : 12/098432 | |
| DATED | : September 22, 2009 | |
| INVENTOR(S) | : Komiya | |

It is certified that error appears in the above-identified patent and that said Letters Patent is hereby corrected as shown below:

Title Pg, Item (56) US Patent Documents section insert

-- FOREIGN PATENT DOCUMENTS

JP       582501       11/1993 --.

Signed and Sealed this

Tenth Day of November, 2009

David J. Kappos
*Director of the United States Patent and Trademark Office*